United States Patent [19]

Lavash

[11] Patent Number: 5,062,392
[45] Date of Patent: Nov. 5, 1991

[54] FILTERING AND DISPOSAL SYSTEM FOR PET LITTER

[75] Inventor: Bruce W. Lavash, West Chester, Ohio

[73] Assignee: The Procter & Gamble Company, Cincinnati, Ohio

[21] Appl. No.: 507,697

[22] Filed: Apr. 10, 1990

[51] Int. Cl.$^5$ ............................................. A01K 29/00
[52] U.S. Cl. ..................... 119/167; 119/169
[58] Field of Search ............................................. 119/1

[56] References Cited

U.S. PATENT DOCUMENTS

| | | | |
|---|---|---|---|
| 3,796,188 | 3/1974 | Bradstreet | 119/1 |
| 3,809,013 | 5/1974 | Rigney et al. | 119/1 |
| 3,828,731 | 8/1974 | White | 119/1 |
| 3,892,846 | 7/1975 | Wortham | 426/76 |
| 3,965,863 | 6/1976 | Scott | 119/1 |
| 4,096,827 | 6/1978 | Cotter | 119/1 |
| 4,203,388 | 5/1980 | Cortigene et al. | 119/1 |
| 4,279,217 | 7/1981 | Behringer | 119/1 |
| 4,308,825 | 1/1982 | Stepanian | 119/1 |
| 4,312,295 | 1/1982 | Harrington | 719/1 |
| 4,405,354 | 9/1983 | Thomas, II et al. | 71/21 |
| 4,458,629 | 7/1984 | Gerber | 119/1 |
| 4,469,046 | 9/1984 | Yananton | 119/1 |
| 4,494,481 | 1/1985 | Rodriguez et al. | 119/1 |
| 4,494,482 | 1/1985 | Arnold | 119/1 |
| 4,517,919 | 5/1985 | Benjamin et al. | 119/1 |
| 4,534,315 | 8/1985 | Sweeney | 119/1 |
| 4,615,300 | 10/1986 | McDonough | 119/1 |
| 4,628,863 | 12/1986 | Eichenauer | 119/1 |
| 4,640,225 | 2/1987 | Yananton | 119/1 |
| 4,649,862 | 3/1987 | Neary | 119/1 |
| 4,711,198 | 12/1987 | Mossbarger | 119/1 |
| 4,723,510 | 2/1988 | Skillestad | 119/1 |
| 4,724,955 | 2/1988 | Martin et al. | 206/204 |
| 4,756,273 | 7/1988 | Yananton | 119/1 |
| 4,763,603 | 8/1988 | Coes | 119/1 |

(List continued on next page.)

FOREIGN PATENT DOCUMENTS 2614502 11/1988 France ................................... 119/1

OTHER PUBLICATIONS

PCT International Publication No. WO 88/00434, International Publication Date 1/28/88, P. Yananton—Non-Absorbent Litter for Use with Absorbent Pad.

Co-pending commonly assigned U.S. Patent Application of J. L. Hammons et al., Ser. No. 507,696 filed Apr. 10, 1990 (No copy supplied)—Pet Litter Box System Which Prevents the Development of Unpleasant Odors.

Co-pending commonly assigned U.S. Patent Application of W. R. Ouellette et al., Ser. No. 507,695 filed Apr. 10, 1990 (No copy supplied)—Animal Waste Collection System Comprising Nonsorbent, Nonclumping Litter, Liquid Sorbent Means & Filter.

Primary Examiner—John G. Weiss
Assistant Examiner—R. Thomas Price
Attorney, Agent, or Firm—E. Kelly Linman; John V. Gorman; Richard C. Witte

[57] ABSTRACT

A combined litter filtering and disposal system. A particularly preferred system comprises a highly porous litter filtering member underlying a protective member which prevents the pet from coming in contact with and damaging the filtering member in use. The protective member includes a centrally located slit, for allowing granular material, such as litter, to readily pass through onto the underlying filtering member when the system is lifted from the litter box. By employing two discrete members oriented as described, the functions of filtering and resistance to cat's claws are decoupled from one another, i.e., there is no longer a need to compromise between strength and filtering efficiency. Each member of the present bicomponent system can be optimally designed for its intended function, i.e., the uppermost protective member which underlies the litter is designed to provide reliable resistance to ripping by or entanglement of the cat's claws, while the lowermost highly porous filtering member is designed to maximize filtering efficiency by providing more rapid separation of fecal excrement from the litter when the system is lifted from the litter pan.

28 Claims, 13 Drawing Sheets

U.S. PATENT DOCUMENTS

| | | | |
|---|---|---|---|
| 4,766,845 | 8/1988 | Bavas | 119/1 |
| 4,771,731 | 9/1988 | Derx et al. | 119/1 |
| 4,774,907 | 10/1988 | Yananton | 119/1 |
| 4,784,082 | 11/1988 | Wolfe | 119/1 |
| 4,800,841 | 1/1989 | Yananton et al. | 119/1 |
| 4,802,442 | 2/1989 | Wilson | 119/1 |
| 4,817,560 | 4/1989 | Price et al. | 119/1 |
| 4,840,140 | 6/1989 | Yananton et al. | 119/1 |
| 4,842,593 | 6/1989 | Jordan et al. | 604/360 |
| 4,844,010 | 7/1989 | Ducharme et al. | 119/1 |
| 4,848,274 | 7/1989 | Yananton | 119/1 |
| 4,852,518 | 8/1989 | Yananton | 119/1 |
| 4,869,204 | 9/1989 | Yananton | 119/1 |
| 4,870,924 | 10/1989 | Wolfe | 119/1 |
| 4,913,954 | 4/1990 | Mack | 428/213 |
| 4,961,930 | 10/1990 | Perdelwitz, Jr. | 424/411 |

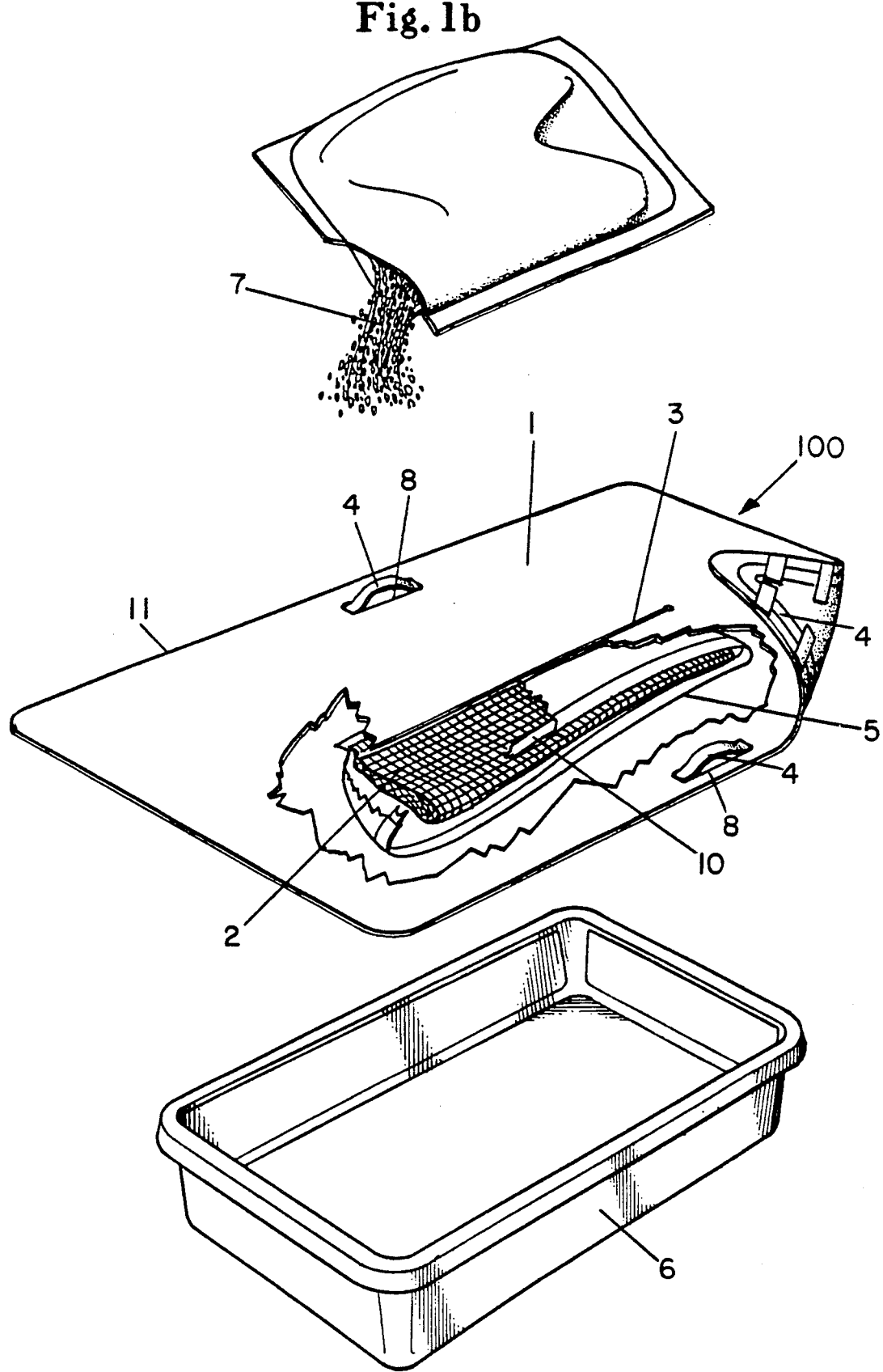

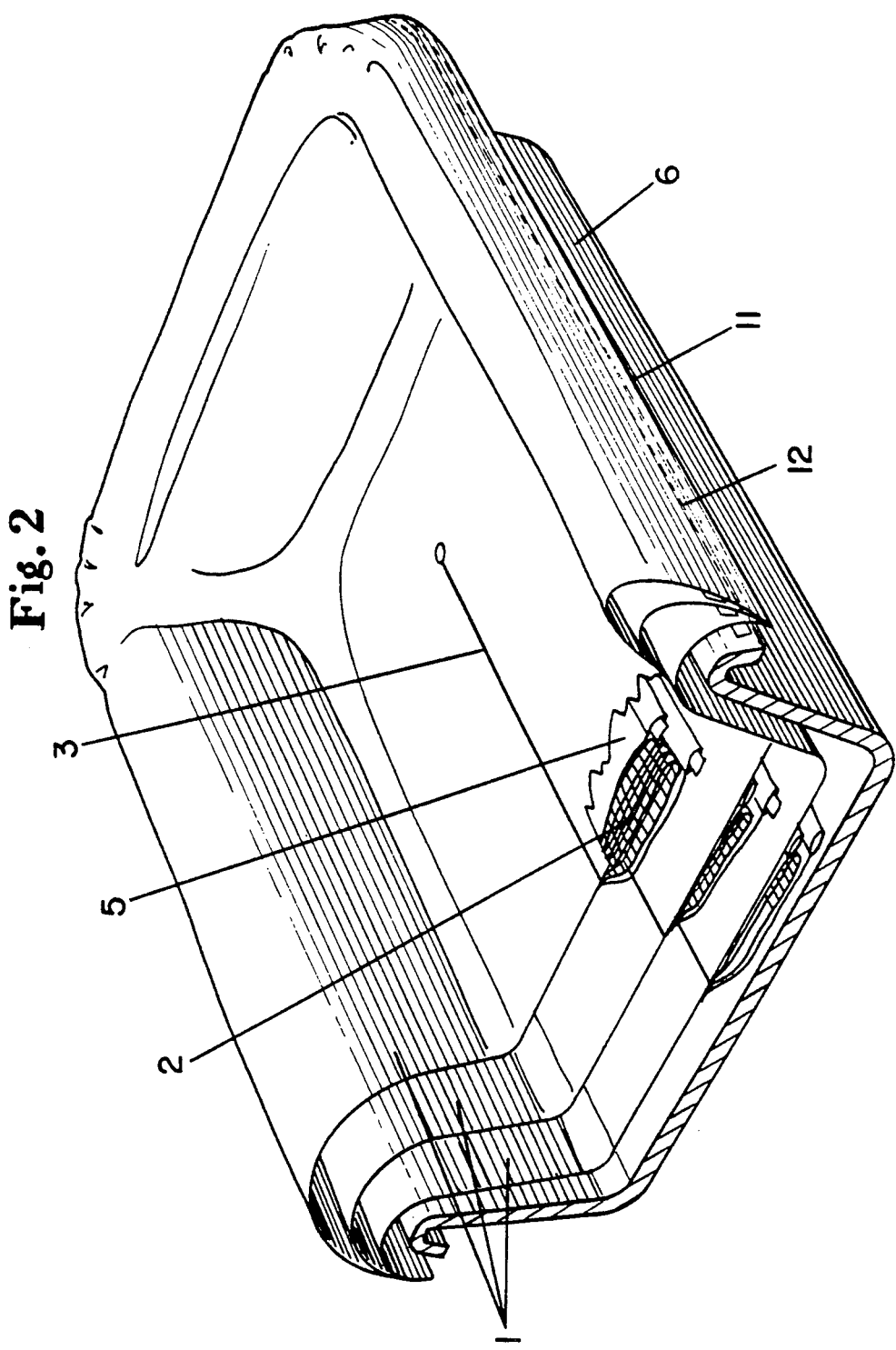

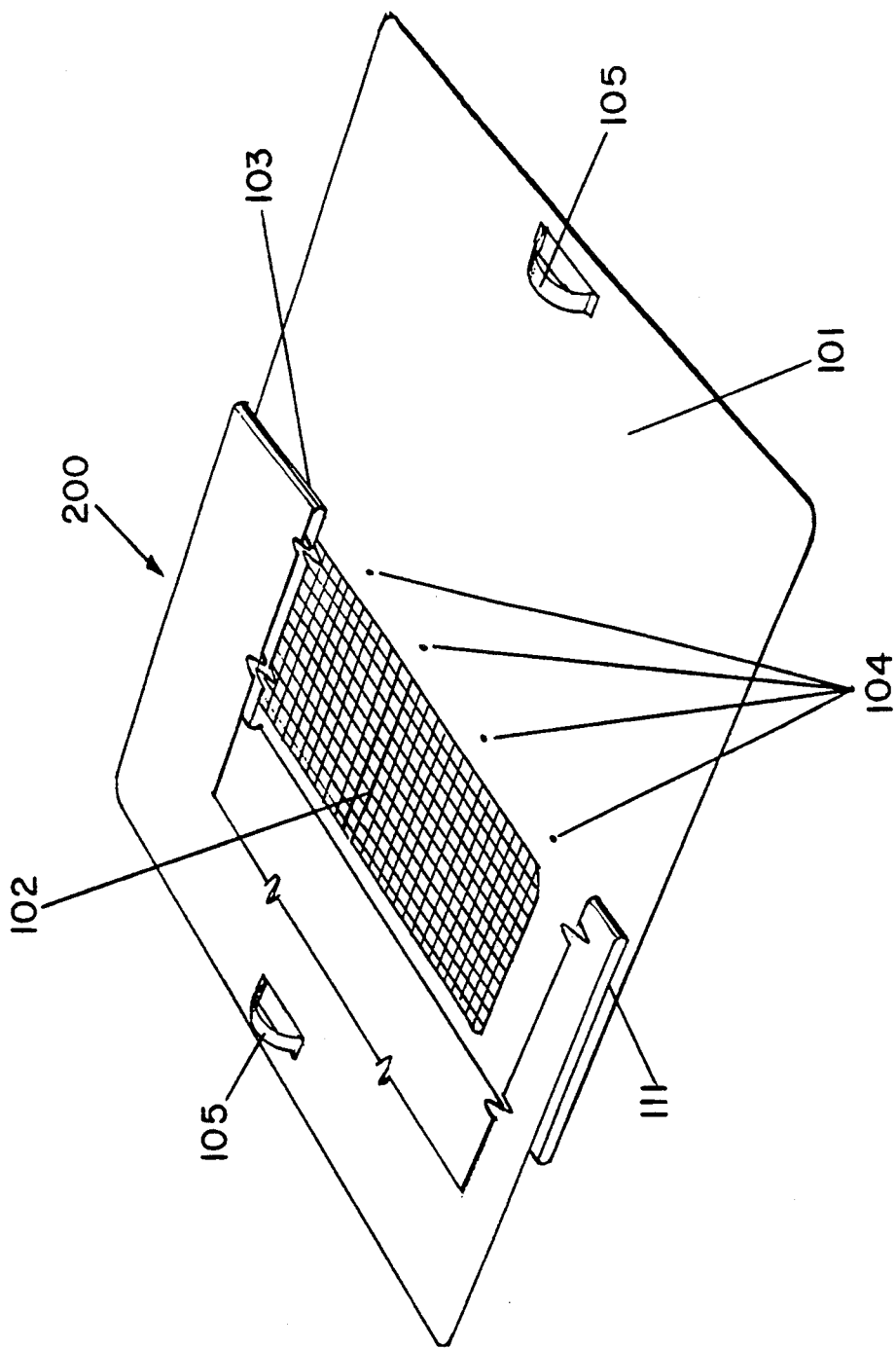

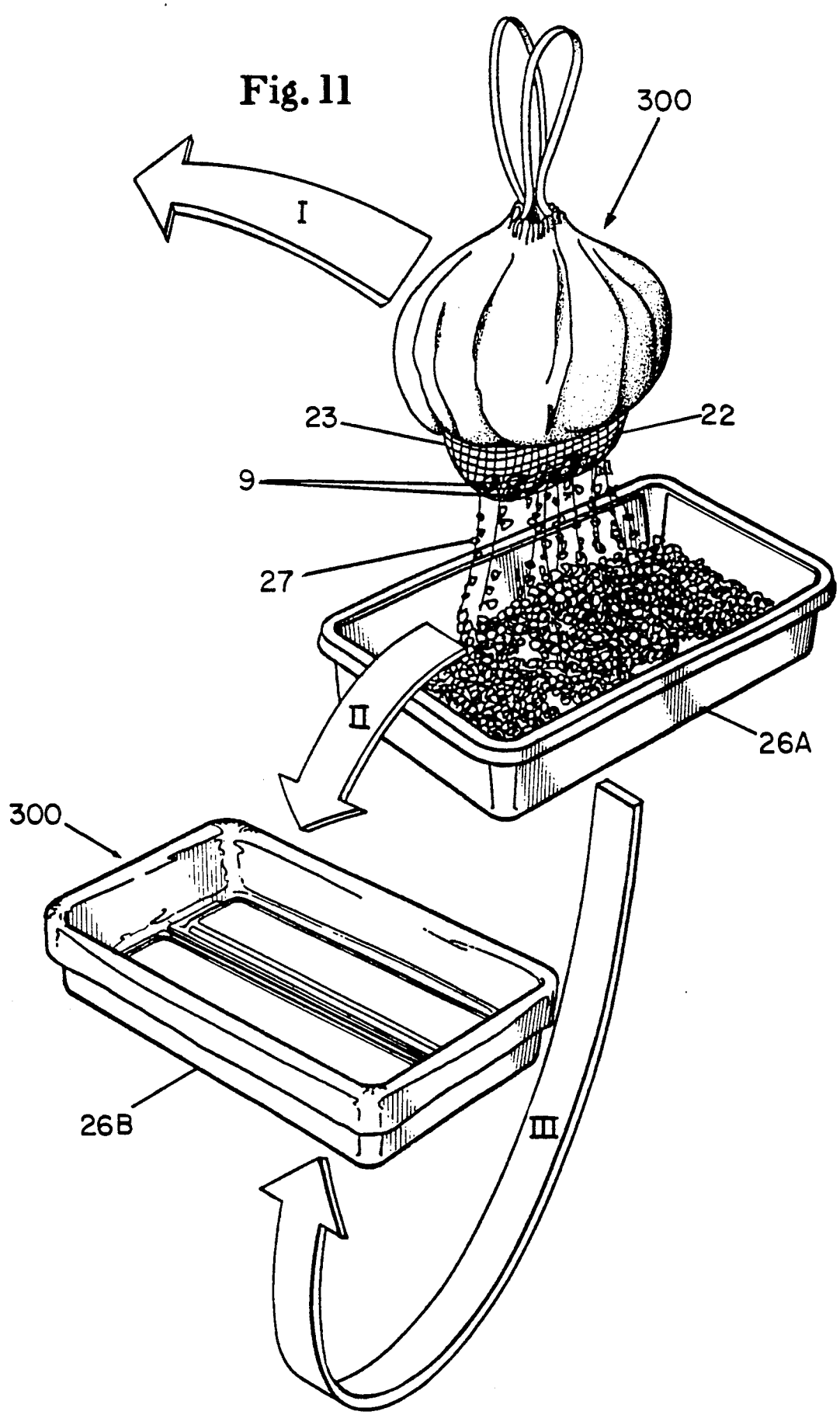

5,062,392

FILTERING AND DISPOSAL SYSTEM FOR PET LITTER

TECHNICAL FIELD

The present invention relates to a filtering and disposal system for granular materials which are typically utilized in the home as pet litter.

The present invention further relates to such a system wherein solid excrement can be filtered from the litter to permit reuse of the litter without need for human contact with the excrement or the litter.

The present invention further relates to such a system which may be employed in conjunction with absorbent means intended to absorb the liquid excreta, i.e., urine.

The present invention further relates, in a particularly preferred embodiment, to such a system wherein absorbent means are integrated into the filtering and disposal system and are disposed of along with the fecal excrement when the filtering and disposal system is lifted to initiate the litter filtering and separation process.

BACKGROUND OF THE INVENTION

Traditionally, animals which are housed within a dwelling intended primarily for human habitation are provided a pan or receptacle in which to relieve themselves. This receptacle is normally filled with a granular material such as clay, which is intended to absorb urine as well as provide the pets, especially cats, with a medium in which to dig and/or bury their excrement. One of the major problems with systems of this type is that the granular material, i.e., the litter, gets filled with excrement, particularly feces. As a result, most pet owners dispose of the litter on a frequent and regular basis in order to dispose of the excrement without directly handling it. In most instances the litter is disposed of long before its useful life as an absorbent has been exhausted. Additional problems with traditional systems of the aforementioned type are the inconvenience, mess and health hazard associated with the disposal operation.

Numerous attempts have been made to address these problems, with limited success. U.S. Pat. No. 4,802,442 issued to Wilson on Feb. 7, 1989 and U.S. Pat. No. 4,817,560 issued to Prince et al. on Apr. 4, 1989 both describe durable removable screens which are intended to filter the fecal excrement from the litter for separate disposal. In both these cases the disposal of the fecal excrement is still a problem, since it must be removed from the filtering device for disposal. The filtering device must then be either reused in a soiled condition or cleaned. In either case, the filter must be reinserted into the litter for subsequent use. These steps involve several handling operations, all of which involve significant contact with the soiled filter and/or fecal excrement. Needless to say, most pet owners find this highly undesirable.

U.S. Pat. No. 3,796,188 issued to Bradstreet on Mar. 12, 1974 and U.S. Pat. No. 4,096,827 issued to Cotter on June 27, 1978 describe disposal systems which are intended to minimize contact with both the filtering device and the fecal excrement by, respectively, sliding a cover or flipping the receptacle, whereby the litter is filtered and the fecal excrement is removed. One significant drawback of each of these devices is their complexity of construction. In addition, these devices still embody a soiled filter which must be cleaned, thereby necessitating significant human contact to complete the disposal operation.

Several issued U.S. Patents disclose a disposable filter which is used in an attempt to overcome the human contact problem previously described. U.S. Pat. No. 4,312,295 issued to Harrington on Jan. 26, 1982 describes a filter inserted into a litter pan before the litter is added. The filter is formed by providing a multiplicity of slits in a web. In that execution the slits open under the weight of the litter when the filter is lifted from the pan to facilitate the filtering operation. U.S. Pat. No. 3,809,013 issued to Rigney et al. on May 7, 1974 and U.S. Pat. No. 4,784,082 issued to Wolfe on Nov. 15, 1988 both describe similar filtering devices. These filtering devices comprise impervious webs having partially perforated, but unopened areas which open to form apertures under the weight of the litter when the filter is lifted.

A significant problem with filtering systems of the aforementioned type is that due to the fact that a pet scratching in the litter may come in direct contact with the filtering media while the filtering system is in use, the filtering media employed must normally be selected based on a compromise between strength and filtering ability. This compromise is necessary because the hole or aperture size in the filtering media must be selected based on the comparative size difference between the litter and the anticipated size of the fecal excrement. Once the hole size has been determined, the only way in which adequate strength can be provided is by properly adjusting the hole spacing. For fast, efficient filtering of the fecal excrement from the litter, a minimum spacing between adjacent holes is desirable. However the strength required to resist damage when the pet digs typically precludes extremely close hole spacing. Thus the filtering operation normally takes a relatively long time to carry out and often requires shaking of the filtering media to keep the filtering operation from ceasing altogether before it is complete.

U.S. Pat. No. 4,615,300 issued to McDonough on Oct. 7, 1986 attempts to address this issue by employing a stacked filtering system comprising a highly porous mesh having an underlying impervious flap. The excrement and/or litter is prevented from soiling the underlying filtering units contained within the stack by the impervious flap underlying each of the porous mesh members. While the McDonough system allegedly provides more efficient filtering, access by the pet to the uppermost highly porous mesh can be had as a result of the pet's digging action. The natural instinct of animals, especially cats, to dig could thus result in the uppermost filter member being substantially ruptured and rendered ineffective at properly filtering fecal excrement from the litter when the filter is lifted to perform the intended separating operation.

Another problem which may occur with structures of the type disclosed by McDonough is that during the course of digging, the cat's claws could become entangled in the filter. At best, this may lead to scattering of the litter material about the room or at worst, cause injury to the cat.

It is an object of the present invention to provide a litter filtering and disposal system which overcomes the various problems associated with prior art litter filtering and disposal systems.

It is another object of the present invention to provide a simple, fast and inexpensive means to remove fecal matter from the granular material which is used as the litter.

Another object of the present invention is to provide a convenient, inexpensive way to dispose of animal excreta, both solid and liquid, which is adaptive to current consumer habits and practices.

Another object of the present invention is to provide a hygienic means for collecting and disposing of animal excreta without the need for human contact with either the excreta or the litter and without the need to prematurely dispose of the litter.

It is still another object of the present invention to provide a filtering and disposal system capable of meeting the widely differing needs of pet owners, i.e., some pet owners feel that daily cleaning is necessary while others allow the receptacle to stand for days or even weeks without taking steps to clean it.

DISCLOSURE OF THE INVENTION

Briefly, the present invention, in a particularly preferred embodiment, comprises a combined litter filtering and disposal system. A particularly preferred system comprises a highly porous litter filtering member underlying a protective member which prevents the pet from coming in contact with and damaging the filtering member in use. The protective member includes a means, such as a centrally located slit, for allowing granular material, such as litter, to readily pass through onto the underlying filtering member when the system is lifted from the litter box. By employing two discrete members oriented as described, the functions of filtering and resistance to cat's claws are decoupled from one another, i.e., there is no longer a need to compromise between strength and filtering efficiency. Each member of the present bicomponent system can be optimally designed for its intended function, i.e., the uppermost protective member which underlies the litter is designed to provide reliable resistance to ripping by or entanglement of the cat's claws, while the lowermost highly porous filtering member is designed to maximize filtering efficiency by providing more rapid separation of fecal excrement from the litter when the assembly is lifted from the litter pan.

Such bicomponent filtering and disposal systems of the present invention can be used individually or a multiplicity of such systems may be stacked within the litter pan before the litter is added to permit multiple filtering of the same litter without removal of the litter from the pan. In the latter case, an impervious bag preferably underlies the lowermost filtering member so as to permit simultaneous disposal of the fecal excrement and litter without a filtering operation after the final litter use cycle has been completed.

In a particularly preferred embodiment, bicomponent filtering and disposal systems of the present invention are used in conjunction with a liquid absorbent means intended to absorb the animal urine. This liquid absorbent means may be either in the form of an absorbent granular material, i.e., the litter overlaying the filtering and disposal system in use, or in the form of an absorbent pad which may be an integral portion of the protective member. Combinations of the foregoing absorbent means may also be employed.

For the purpose of defining the present invention, the term absorbent shall refer to materials which will absorb and hold liquid to a substantial degree regardless of the particular mechanism by which this is accomplished. Non-limiting examples of liquid absorbent materials are comminuted wood pulp fluff, tissues, polymeric gelling agents (PGA), clay and the like.

If desired, an odor abatement means, such as acidic buffers, bacteriostats, fungicides, bacterial enzyme inhibitors, combinations thereof or the like, may be employed in conjunction with the liquid absorbent means.

When an absorbent granular litter is employed, the protective member of the filtering and disposal system may be comprised of material which is either pervious or substantially impervious to liquid excreta, i.e. urine. If the protective member is comprised of material which is substantially impervious to liquid transmission, the protective member will substantially prevent the urine from soiling any underlying filtering and disposal systems or the litter pan until the particular filtering and disposal system immediately beneath the granular litter is lifted to initiate the filtering and separating operation.

In an alternative embodiment of the present invention, an absorbent member is integrated into the protective member of the system in much the same manner as an absorbent pad in a disposable baby diaper. In the latter embodiment, a substantially non-absorbent granular material may, if desired, be employed. Such a system permits the liquid to pass through the granular material and be absorbed into the absorbent portion of the protective member. This permits successive cleaning of the granular material by successively removing both the fecal excrement and the absorbed liquid excreta from the litter box each time a filtering and disposal system of the present invention is lifted from the litter pan and disposed of.

In still another embodiment of the present invention, the protective member employed on a filtering and disposal system of the present invention may be comprised of material which is fluid pervious so that urine may readily and completely pass through an entire stack of filtering and disposal systems of the present invention to an underlying absorbent pad beneath the stack of filtering and disposal systems. The granular material may thus be successively cleansed of fecal excrement by successively removing the filtering and disposal systems of the present invention until such time as the lowermost system is removed, i.e., the absorbent pad containing the absorbed liquid is then disposed of along with the fecal excrement and litter as part of the last cleaning operation by enclosing all but the uppermost surface of the absorbent pad within a fluid impervious bag located at the bottom of the stack.

BRIEF DESCRIPTION OF THE DRAWINGS

While the specification concludes with claims particularly pointing out and distinctly claiming the present invention, it is believed the present invention will be better understood from the following description in conjunction with the accompanying drawings in which:

FIG. 1b is a simplified, exploded perspective view of a filtering and disposal system of the type generally shown in FIG. 1a as it would be in normal use in a receptacle with granular litter deposited on its uppermost surface, said system further including a pair of optional drawstring handles for lifting the system from the receptacle to initiate the filtering operation and an optional lowermost shroud and drawstring;

FIG. 2 is a simplified perspective cross-sectional view, taken at a point corresponding to section line A—A of FIG. 1b, depicting a stack of three filtering and disposal systems assembled within the receptacle;

FIG. 4 depicts an alternative embodiment of a filtering and disposal system of the present invention with a windowed filtering member which is protected during use by a folded pleat in the protective cover member;

FIG. 11 depicts a series of steps which could be utilized in conjunction with filtering and disposal systems of the type shown in FIG. 5a (shroud and drawstring removed for clarity) to recycle a non-absorbent granular litter through as many use cycles as desired.

DETAILED DESCRIPTION OF THE INVENTION

The present invention has a number of advantages over animal excreta handling systems disclosed in the prior art. Filtering and disposal systems of the present invention permit efficient and hygienic disposal of animal excreta (in particular, that of house pets) in a low cost manner and without the need for premature disposal of the granular litter material. Several embodiments of the present invention are herein described for dealing with both solid and liquid waste matter. These embodiments may be used individually within the litter receptacle or stacked in multiples within the litter receptacle.

Differing methods for absorbing liquid excreta either within an absorbent granular litter, within a filtering and disposal system of the present invention, or within both are also disclosed.

One critical element of the present invention is the filtering member which is intended to be used in conjunction with a granular material (i.e., the litter). Unlike prior art filtering systems, the filtering member employed in filtering and disposal systems of the present invention is protected from the pet's (in particular, cat's) claws throughout the normal use cycle by a protective member.

Figure 1A:
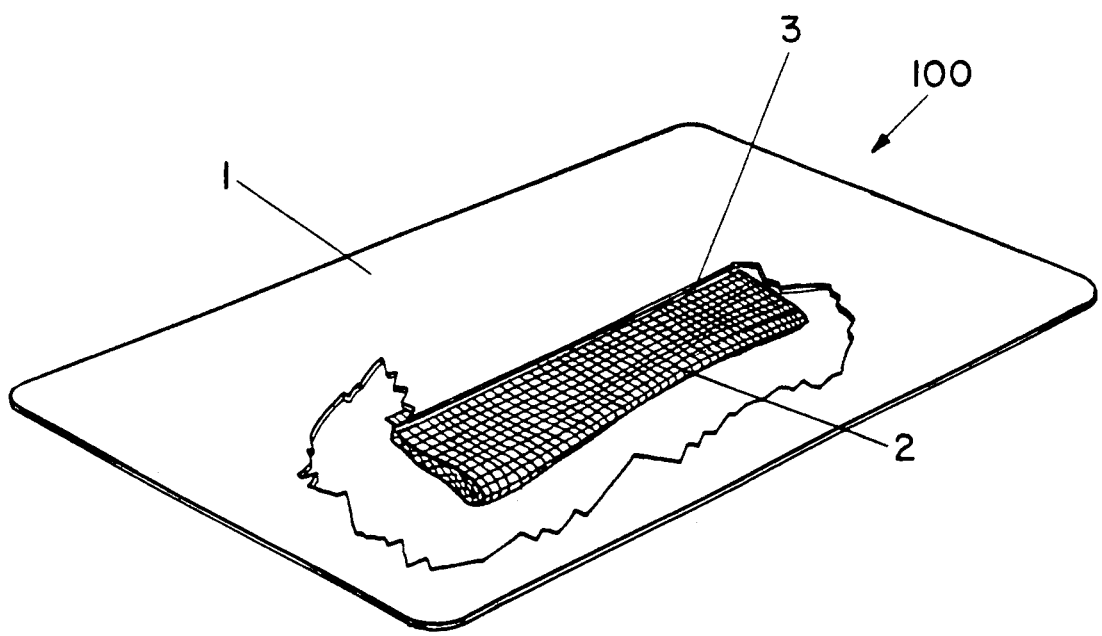
FIG. 1a is a partially broken away simplified perspective view of a filtering and disposal system of the present invention in its most basic form.

FIG. 1a depicts a solid waste filtering and disposal system 100 of the present invention in its simplest form. The system 100 comprises a protective member 1 which overlays and protects the filtering member 2 in use. The protective member 1 may be pervious or impervious to the passage of fluid (i.e., urine), as desired. The uppermost surface of the uppermost protective member 1 contacts the granular litter material contained in the litter box in use. In the embodiment 100 illustrated in FIG. 1a, the protective member 1 may comprise a thin, substantially liquid impervious polymeric film formed of polyethylene, polypropylene, polyethylene terephthalate, nylon or the like. In a particularly preferred embodiment the impervious polymeric film is between about 0.5 mil and about 4.0 mil thick, and most preferably between about 1.0 mil and about 2.0 mil thick.

The primary criteria for the protective member 1 is that it should be constructed in a manner that makes it resistant to being torn by the claws of animals, particularly cats. This protection is required so that when the cat digs in the granular material to bury its excrement during use, the filtering member 2 is prevented from entangling with the cat's claws.

The filtering member 2 is preferably comprised of a highly porous mesh material which will readily allow the granular litter to flow through it while retaining the solid excrement (feces) which was deposited in the litter by the pet. Cat feces, which is essentially cylindrical in shape, has an average length of about 1.25 inches and an average diameter of about 0.60 inches. The range of those measurements are typically about 0.50 inches to about 2.75 inches for length and about 0.25 inches to about 0.80 inches for diameter. Most granular litters which are acceptable as a digging medium to animals such as house cats exhibit a particle size range, as measured by maximum dimension, between about 0.010 inches and about 0.40 inches, most preferably between about 0.04 inches and about 0.20 inches. Thus, when used for ordinary house cats, it has been found that the openings in the porous mesh material should be capable of fully inscribing a circle exhibiting a diameter between about 0.10 inches and about 0.65 inches, most preferably between about 0.25 inches and about 0.45 inches to efficiently perform the desired filtering operation. A plastic mesh comprised of monofilament material of the type manufactured and sold under product designation No. ON5050, exhibiting a square shaped opening having a size of about 0.375 inches, as available from Conwed, 620 N.E. Taft St., Minneapolis, Minnesota 55413 has been found particularly suitable as a filtering member 2 in the practice of the present invention.

During use, as depicted in the exploded view of FIG. 1b, the mesh filtering member 2 is lying folded flat beneath the protective member 1.

Grasping means are preferably included as part of the protective member 1 to facilitate grasping the filtering and disposal system 100 for removal from the litter box or receptacle 6. This grasping means may be a drawstring 4, which is secured about the perimeter of the protective member 1, as generally depicted in FIG. 1b. As can be seen from FIG. 2, the perimeter of the protective member 1 substantially coincides with the litter box 6.

Figure 3:
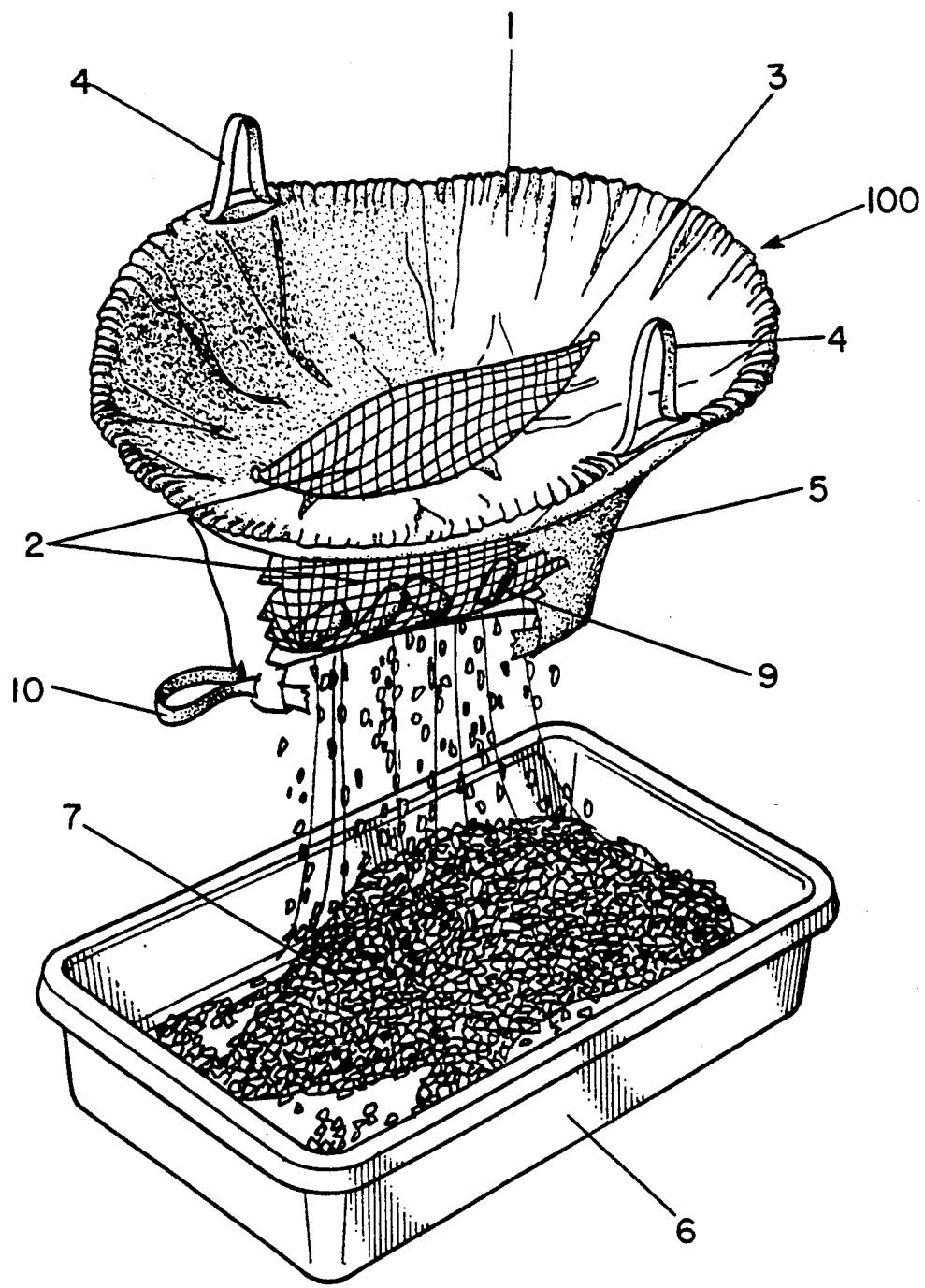
FIG. 3 is a simplified, partially broken away, perspective view of a filtering and disposal system of the type generally shown in FIG. 1b as it would appear during the filtering operation.

In the illustrated embodiment 100, a pair of cutouts 8 in the protective member 1 allow access to the exposed drawstring handles 4. When filtering of the granular litter 7 is desired, the filtering and disposal system 100 is grasped by the opposed drawstring handles 4, as generally depicted in FIG. 3. As the system 100 is lifted from the litter box or receptacle 6, the weight of the granular litter 7 causes the slit 3 to form an opening having a predetermined periphery in the central portion of the protective member 1. This allows the granular litter 7 to flow onto the porous mesh filtering member 2, which is preferably secured about the perimeter of slit 3 to the lowermost surface of protective member 1, and pass through into the litter box or receptacle 6. The fecal excrement 9 remains behind within the porous mesh filtering member 2, and the filtering and disposal system 100 containing the fecal excrement 9 is disposed of as solid waste. The opening in protective member 1 may comprise a single slit 3, as shown, a series of slits or a pleat in the protective cover 101, which opens at its exposed edge 103 as generally shown in FIG. 4.

In a particularly preferred embodiment, the opening in protective member comprises a slit 3 oriented parallel to the largest dimension of the protective member 1. This slit orientation works best when the grasping handles 4 are located along the sides of the protective member 1 which are parallel to the slit 3. The slit 3 may be located either in the center or to one side of the protective member 1.

Further, the slit 3 may, if desired, be frangibly secured in a closed position prior to the lifting operation. For example, the protective member 1 may be perforated at the intended location of the slit 3 so that the weight of the granular litter 7 will cause the perforations to break and thereby create an opening in the protective member 1 when the system 100 is lifted by grasping handles 4.

Figure 9:
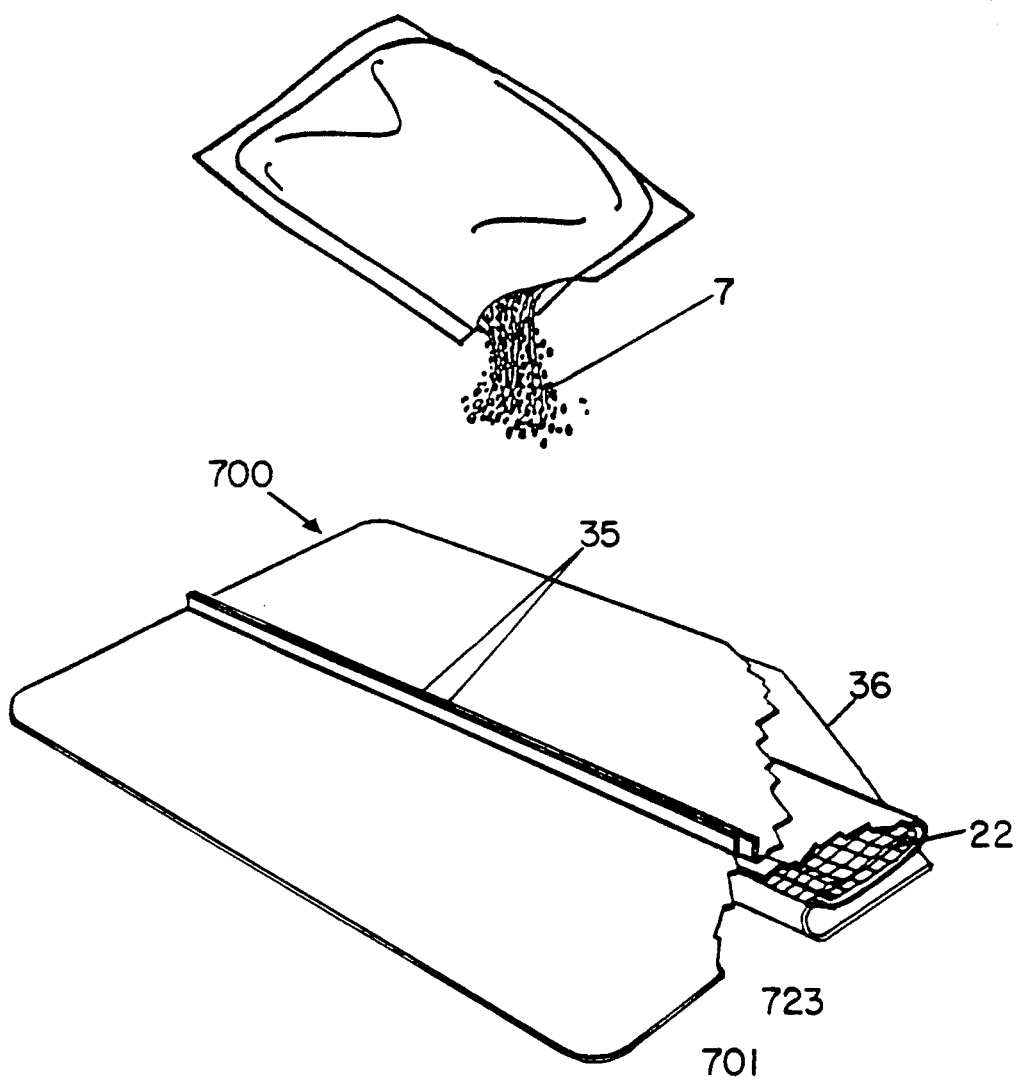
FIG. 9 is a simplified, partially broken away, perspective illustration of yet another embodiment of a filtering and disposal system of the present invention, said embodiment employing a particularly preferred method for maintaining the frangible opening in the protective member in a closed position while the system is in use.
Figure 10:
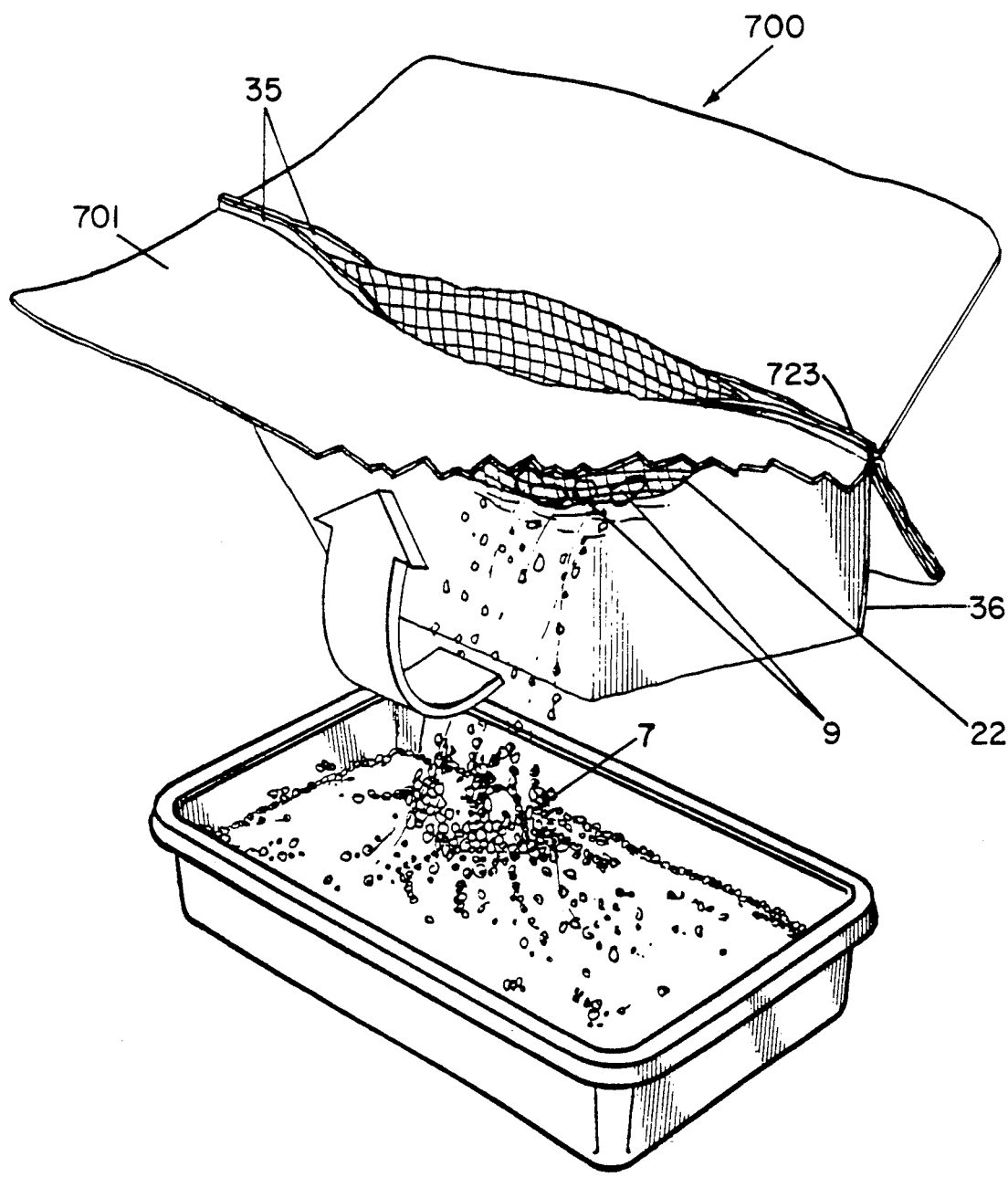
FIG. 10 illustrates how the frangible opening in the protective member shown in FIG. 9 opens when the filtering and disposal system is lifted to initiate the litter filtering operation.

FIGS. 9 and 10 disclose a filtering and disposal system 700 having a particularly preferred frangible opening system at 723. The protective member 701 comprises two pieces of material frangibly secured to one another along a pair of upwardly oriented, opposed flanges 35. The attaching means between the flanges may comprise an adhesive or other suitable mechanism. This particular arrangement allows the weight of the granular litter 7, which is supported on the uppermost surface of protective member 701 when the system 700 is lifted by its opposed edges, to initiate separation between the opposed flanges 35 when the system 700 is picked up, as generally shown in FIG. 10.

As can best be seen in FIG. 10, the configuration of the flanges 35 causes the weight of the granular litter 7 to exert a peeling force against the adhesive or other securement means along the central portion of the opposed flanges 35.

If desired, the outermost portions of the opposed flanges 35 may be more rigorously secured to one another so that only the central portion of the opposed flanges separate form one another under the weight of the granular litter, as generally shown in FIG. 10.

Frangible opening system 723 in protective member 701 offers substantial resistance to opening under the effects of scratching or clawing which could occur during use. Thus, the underlying porous mesh filtering member 22 is completely protected from damage throughout the normal use cycle.

If desired, filtering and disposal system 700 may further include an overwrap 36 which, upon completion of the filtering operation, may be wrapped around the exposed filtering member 22 containing fecal excrement 9, as generally indicated by the arrow in FIG. 10.

Referring again to FIGS. 1a through 2, frangible securement of the slit 3 or other type of opening in protective member 1 prior to lifting of the system 100 helps to ensure that the opening remains closed while the system 100 is in use, protecting the porous mesh filtering member 2 from the cat's claws.

FIG. 3 depicts a filtering and disposal system 100 of the present invention wherein uppermost end of a shroud 5, which substantially surrounds the porous mesh filtering member 2, is in its unfolded condition. This shroud 5 helps to contain the granular litter 7 as it falls through the porous mesh filtering member 2 so that it does not scatter outside the litter box or receptacle 6 during the filtering operation. The shroud 5 also helps to minimize dust being given off to the surrounding environment from the filtering operation. Finally, as can also be seen in FIG. 3, the shroud 5 can be fitted with a means for closing its lowermost end after the filtering of the granular litter 7 is complete. In FIG. 3 this closing means comprises a drawstring 10 secured about the periphery of the shroud. The fecal excrement 9 retained on the uppermost surface of filtering member 2 can thus be fully enclosed for disposal as solid waste by tightening uppermost drawstring 4 and lowermost drawstring 10.

Another benefit of the present invention resides in the ability to stack filtering and disposal systems of the present invention within the litter box or receptacle 6 prior to adding the granular litter 7 thereto. When the systems are stacked, the granular litter 7 filtered through a porous mesh filtering member 2 on the uppermost system falls "cleansed" of fecal excrement and ready for re-use onto an exposed protective member 1 of the underlying filtering and disposal system of the present invention. In this way, frequent cleaning of the granular litter 7 can be facilitated in an efficient, hygienic, and convenient manner.

FIG. 2 discloses a stack of filtering and disposal systems 100 of the type generally shown in FIG. 1 as they could be arranged within a litter box or receptacle 6. As with the single system embodiment 100 shown in FIG. 1, each porous mesh filtering member 2 is folded flat under the protective member 1 to which it is secured about its periphery so as to totally enclose the slit 3 in protective member 1. The slit 3 or other opening remains closed under the weight of the granular litter 7 (not shown in FIG. 2) until filtering of the litter is initiated by lifting the uppermost system 100 in the stack. Upon removal of the uppermost filtering and disposal system 100, the filtered granular litter 7, which has been "cleansed" of fecal excrement, is deposited directly onto the immediately underlying protective member 1, and the use cycle is ready to begin anew.

A stack comprised of three filtering and disposal systems 100 is shown in FIG. 2. A greater or lesser number of such systems 100 could be assembled in the same manner. As can also be seen in FIG. 2, each individual system 100 includes a protective cover member 1 which extends to and over the edge of the litter box or receptacle 6.

All of the systems 100 may, if desired, be frangibly secured to one another along at least a portion of their periphery, as shown at 11, so that they can be installed in the litter box or receptacle 6 as a single unit. Each time it becomes necessary to perform the filtering operation, it is desirable that only the uppermost system 100 be removed from the stack.

If the systems 100 are frangibly secured to one another at their peripheries, then a release mechanism must be provided to permit separation of the systems from one another for all but the lowermost system. This release mechanism may be comprised of lines of perforations 12 extending about the periphery of each protective member 1, as generally shown in FIG. 2. The release mechanism may alternatively be comprised of an adhesive (not shown), with decreasing amounts of adhesive being applied to each overlying filtering and disposal system so that separation will preferentially occur from the top to bottom of the stack.

Means (not shown) to attach either the individual systems 100 or the stack of systems 100 to the litter box or receptacle 6 are also preferably included about the periphery 11 of the protective member which comes in contact with the litter box or receptacle 6. This means may, for example, comprise a pressure sensitive adhesive (not shown) or an elastomeric element (also not shown) or a drawstring (also not shown) secured at one or more locations about the periphery of the protective member 1 and configured so as to cause the filtering and disposal system 100 to grip the corners of the litter box or receptacle 6.

An alternative construction for a filtering and disposal system 200 of the present invention is generally depicted in FIG. 4. In this execution the filtering member 102 is secured about its periphery so as to form a window in the protective member 101. The protective member 101 is then folded over itself so as to form a pleat 111 which completely blocks the porous mesh filtering member 102, as shown. The opening in protective member 101 comprises the exposed edge 103 of pleat 111 in the protective member 101, which may be frangibly tacked down by means of an adhesive or the like at points 104 to prevent premature opening. Upon lifting of the filtering and disposal system 200 using the opposed drawstring handles 105, the pleat 111 opens along its exposed edge 103 and the granular litter containing fecal excrement flows onto and through the porous mesh filtering member 102, separating the fecal excrement from the granular litter.

As will be appreciated from the foregoing descriptions, the filtering and disposal systems described thus far represent a unique and convenient way of filtering solid waste from the granular litter to permit re-use of the granular litter. Although the solid waste represents a significant source of potential odor, pets also excrete urine which is also a significant source of odor. This is particularly true of cats, which typically have a high soluble solids content in their urine. Most traditionally used granular litters are merely particles of clay which, although somewhat absorbent, are very inefficient in their ability to absorb large amounts of liquid and/or prevent odor.

Figure 5A:
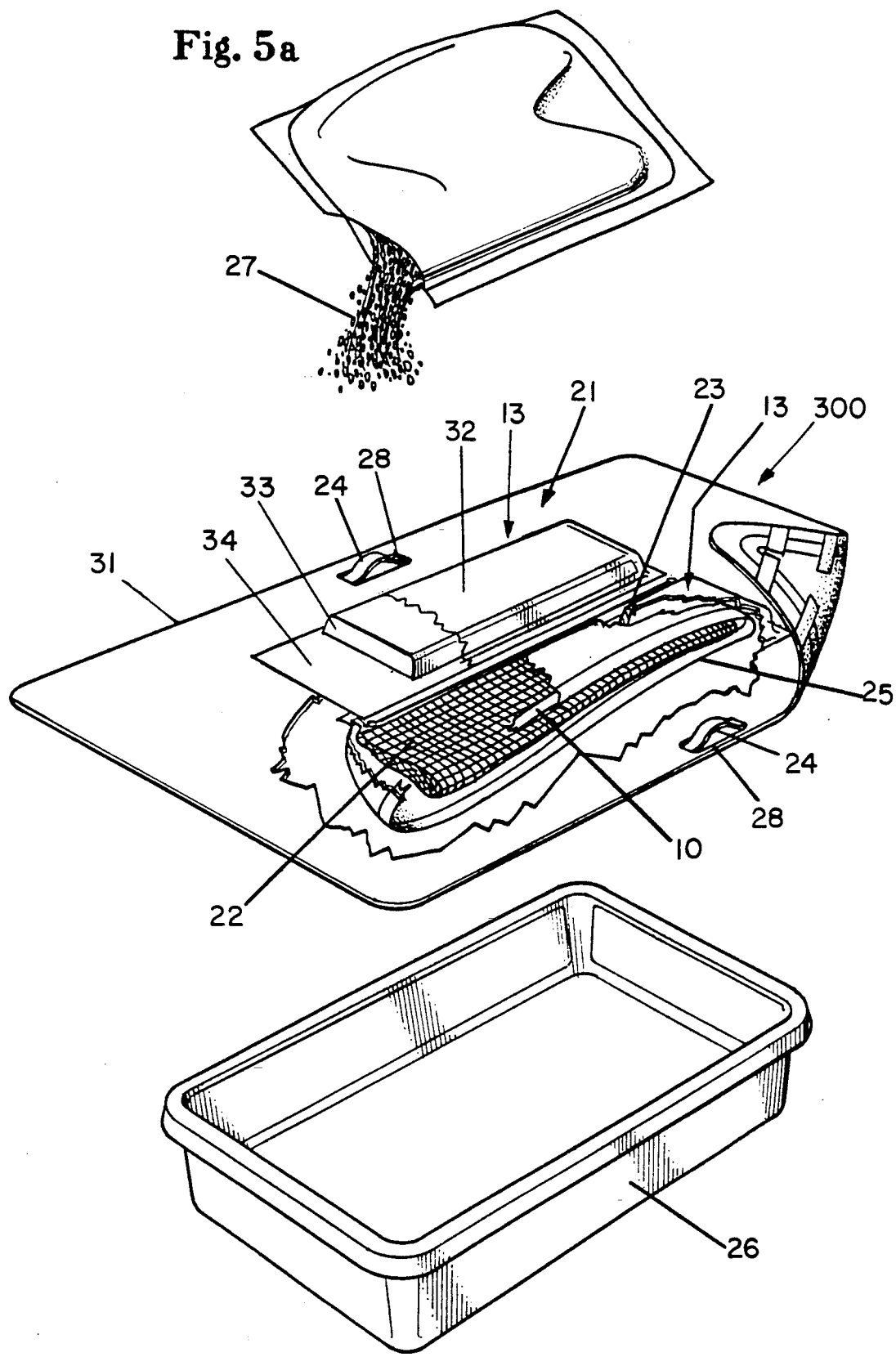
FIG. 5a is a simplified partially broken .. exploded perspective view of a filtering and disposal system of the present invention which employs a filtering member and a protective member including a liquid absorbent means.

In a particularly preferred embodiment, the present invention not only solves the solid waste separation and disposal problems previously described, but also addresses the problem of controlling liquid waste and its associated odor. FIG. 5a depicts a filtering and disposal system 300 of the present invention which addresses both the solid and liquid waste handling and disposal problems. The filtering system 300 comprises a protective member 21 overlaying and secured to a filtering member 22. The basic construction of the system 300 may be generally similar to that employed with the system 100 disclosed in FIG. 1b. However, the protective member 21 in system 300 further includes a pair of liquid absorbent structures 13, one located adjacent each edge of the slit 23 in protective member 21. Each liquid absorbent structure 13 preferably comprises a top sheet 32, a liquid absorbent core 33 and a back sheet 34.

The top sheet 32 comprises a liquid permeable, scratch resistant material. There are many such porous materials which will satisfy this need. Polymeric fiber based nonwovens, such as spunbonded, melt blown or carded webs, which have been thermally bonded to minimize loose fibers, are generally suitable. Spunbonded webs comprised of polyethylene terephthalate (PET) which have been thermally calendered are particularly suitable. In addition, three-dimensionally expanded, apertured plastic films, such as those disclosed in commonly assigned U.S. Pat. No. 3,929,135 issued to Thompson on Dec. 30, 1975 and commonly assigned U.S. Pat. No. 4,342,314 issued to Radel et al. on Aug. 3, 1982 are also suitable. Since such three-dimensionally expanded, apertured plastic films do not have any fibers to come loose and entangle the cat's claws, they are naturally resistant to abrasion.

Whatever top sheet material is selected, it should exhibit sufficient porosity that it will readily pass liquid i.e., urine. However, the top sheet 32 should not permit the overlying granular litter 27 to readily pass therethrough. When three-dimensionally expanded, apertured plastic films are employed, aperture sizes capable of inscribing a circle having a diameter between about 0.001 inches and about 0.150 inches, and most preferably between about 0.020 inches and about 0.100 inches, are generally able to meet these requirements.

Immediately underlying the top sheet 32 is an absorbent core 33. This core can comprise any number of inexpensive liquid absorbent materials such as creped tissue, comminuted wood pulp fluff, polymeric gelling agents (PGA) and mixtures or combinations thereof.

Underlying the absorbent core 33 and extending beyond its periphery is a back sheet 34. The back sheet 34 is impervious to liquid flow, and can be comprised of polymeric film, such as low density polyethylene, having a thickness between about 0.5 and about 4.0 mils, most preferably between about 1.0 and about 2.0 mils. The back sheet 34 and top sheet 32 are preferably bonded together along at least a portion of their periphery.

The liquid absorbent structures 13 serve two important functions. First, they absorb liquid urine. Second, they protect the porous mesh filtering member 22 underlying slit 23 from becoming entangled with the cat's claws during the normal use cycle.

Opening or slit in protective member 21 allows the granular litter 27 access the porous mesh filtering member 22 when the system 300 is lifted by the opposed drawstring handles 24, which are accessible through cut outs 28.

Since the absorbent structures 13 secured to the uppermost surface of protective member 21 will absorb liquid, the overlaying granular litter 27 is only required to satisfy the animal's natural desire to dig and/or cover its excrement. For this reason, the granular litter 27 used in this particular embodiment of the present invention need not be liquid absorbent. In fact, in a particularly preferred embodiment, the granular litter 27 is non-absorbent to liquid. The only requisite of the granular litter 27 in an embodiment of the type shown in FIG. 5a is that it be acceptable to the cat as a digging medium and that it readily, and preferably as completely as possible, pass liquid through itself and onto the liquid absorbent structures 13 secured to the uppermost surface of protective member 21.

In a particularly preferred embodiment of the present invention, one or more odor abatement means, such as acidic buffers, bacteriostats, fungicides, odor adsorbents, bacterial enzyme inhibitors or combinations thereof, are incorporated within the granular litter 27, within the absorbent core portions 33 of absorbent structures 13 or both.

Figure 5B:
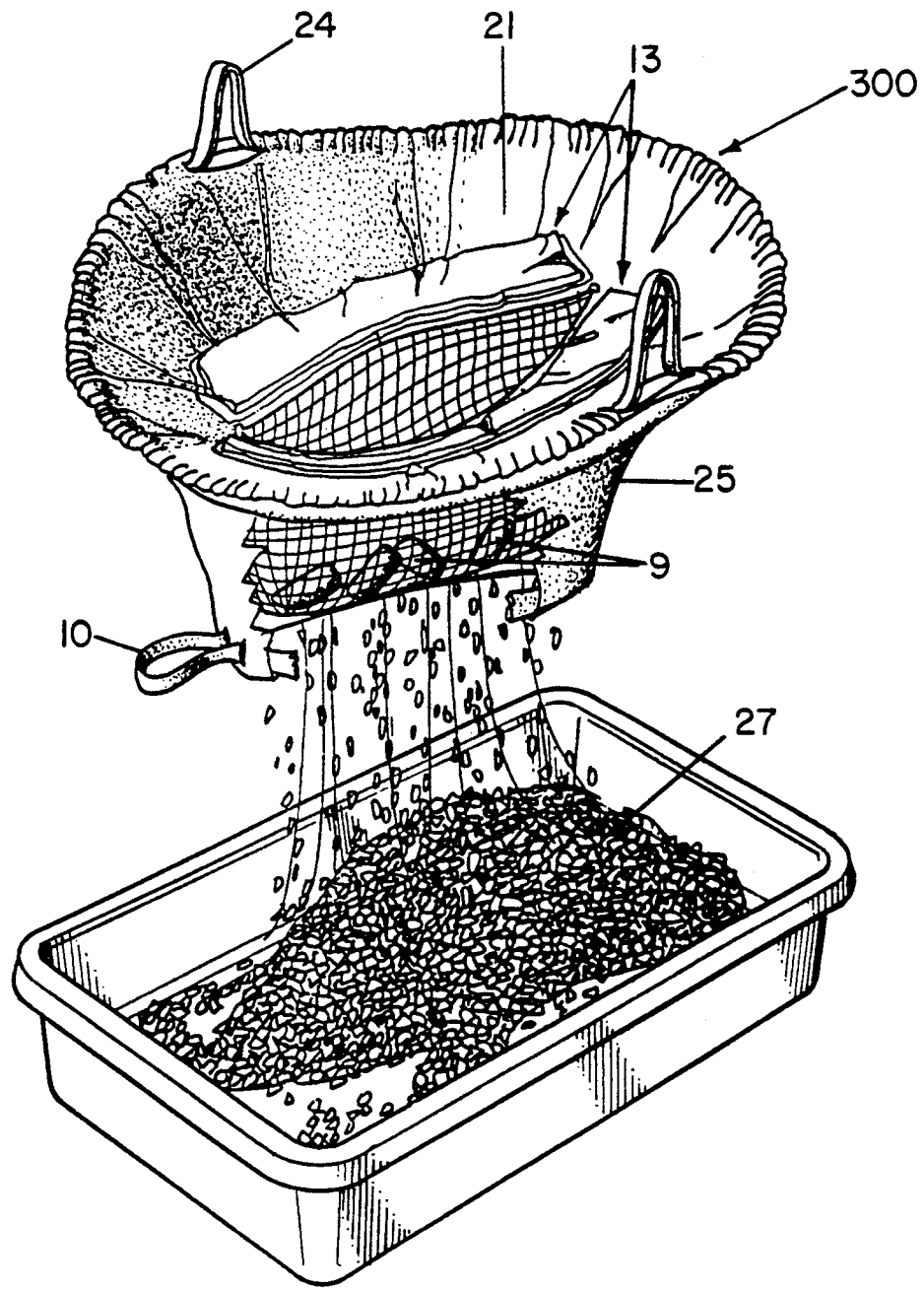
FIG. 5b is simplified, partially broken away perspective view of the filtering and disposal system of FIG. 5a as it would appear during the filtering operation.

As with the filtering and disposal systems shown in FIGS. 1a and 4, the opening in the protective member 21 may comprise a slit 23, as shown, a series of slits (not shown), a hole (not shown), a pleat (not shown) or other opening which will permit the granular litter 27 to access the filtering member 22 only after the system 300 has been lifted by its opposed drawstring handles 24. The opening is maintained in a closed position (preferably by frangible securement means not shown in FIG. 5a) until the pet owner desires to initiate the filtering operation by lifting the system 300 by means of the opposed drawstring handles 24. At this time the slit 23 in protective member 21 opens under the weight of the granular material 27, and the granular material flows through the opening onto the underlying porous mesh filtering member 22. After filtering, it passes into the litter box or receptacle 26. The fecal excrement 9 retained on filtering member 22 and the liquid within absorbent structures 13 can now be disposed of as solid waste by closing drawstring 24 in protective member 21 and drawstring 10 in shroud 25, as generally shown in FIG. 5b. This operation leaves the granular litter 27 "cleansed", relatively free of liquid, and ready for additional use. Accordingly, the present invention minimizes the amount of solid waste, i.e., the amount of granular litter, that enters our landfills. In addition, it provides the pet owner with a convenient, safe, and hygienic way of refreshing the granular litter without the need for human contact therewith.

Figure 6:
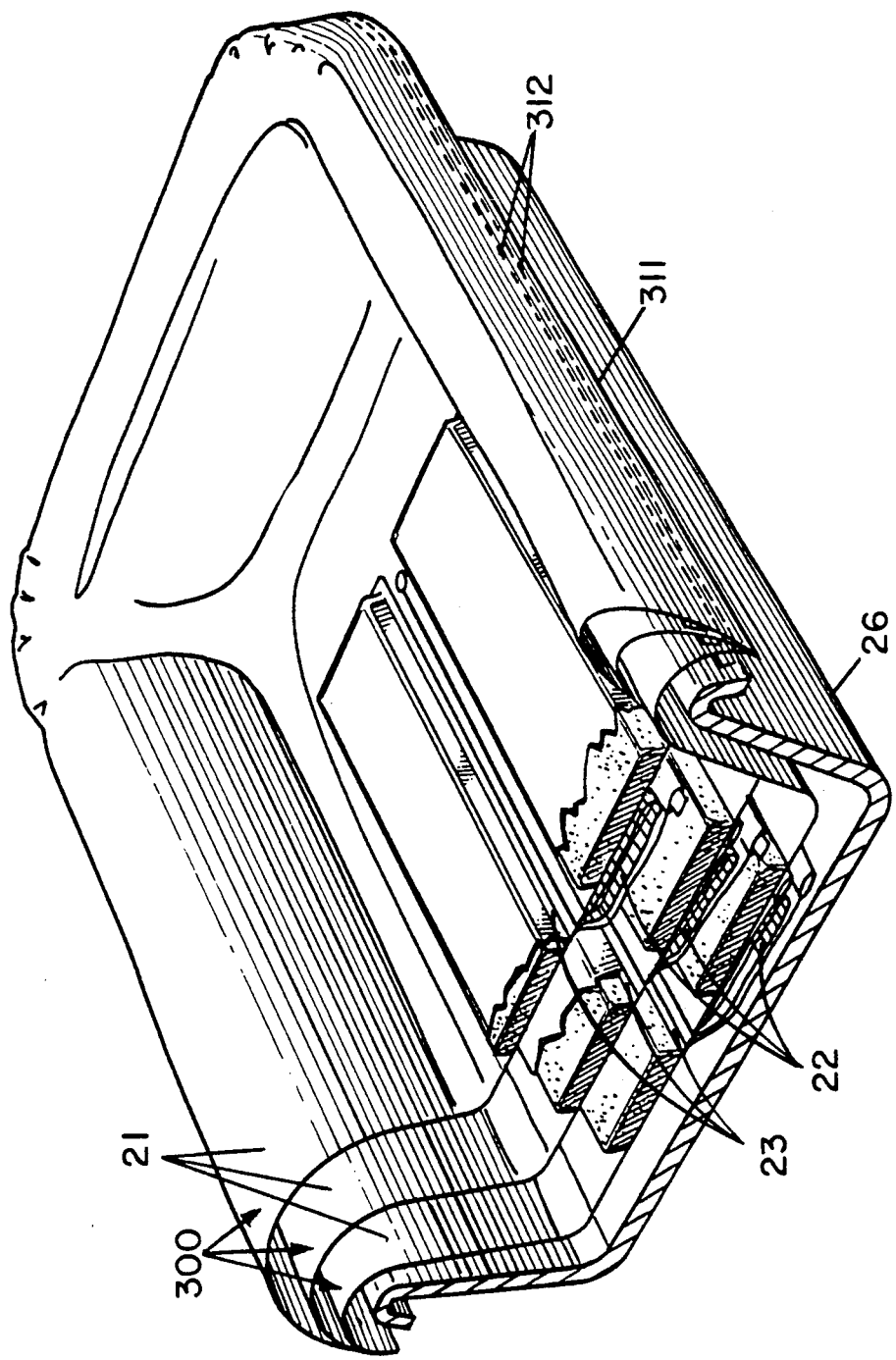
FIG. 6 is a simplified perspective cross-sectional view taken at a point corresponding to section line B—B of FIG. 5a, said view showing a stack of three filtering and disposal systems of the type generally shown in FIG. 5a stacked within the receptacle.

FIG. 6 depicts a stack of filtering and disposal systems 300 of the type shown in FIGS. 5a and 5b superposed upon one another. If desired, they can be frangibly secured to one another about their periphery 311 in a manner similar to that shown in FIG. 2, e.g., by lines of perforation 312. As the pet uses the system shown in FIG. 6, the liquid waste generally passes through the granular litter (not shown), especially if the granular litter is non-absorbent to liquid. This liquid is then absorbed by the absorbent structures 13 secured to the uppermost surface of the uppermost protective member 21 in the stack. Solid waste is left in the granular litter. When the pet owner wishes to "cleanse" the granular litter, he/she grasps the uppermost filtering and disposal system 300 and lifts. This operation opens the slit 23 in protective member 21, filters the fecal excrement from the granular litter and deposits the filtered granular litter onto the underlying protective member 21 of the next adjacent filtering and disposal system 300, ready for additional usage by the pet. Meanwhile, the urine contained in absorbent structures 13 and the fecal excrement retained on filtering member 22 are conveniently disposed of along with the spent filtering and disposal system 300. In this way the bulky granular litter may be re-used almost indefinitely.

Subsequent "cleansings" are effected by lifting and removing subsequent filtering and disposal systems 300. After all of the systems 300 in a given stack have been used, the granular litter can be temporarily transferred to a second receptacle, a new stack of filtering and disposal systems 300 can be inserted into the litter box or receptacle 26, and the cycle restarted by dumping the litter from the second receptacle back on top of the fresh stack of filtering and disposal systems 300.

Figure 7:
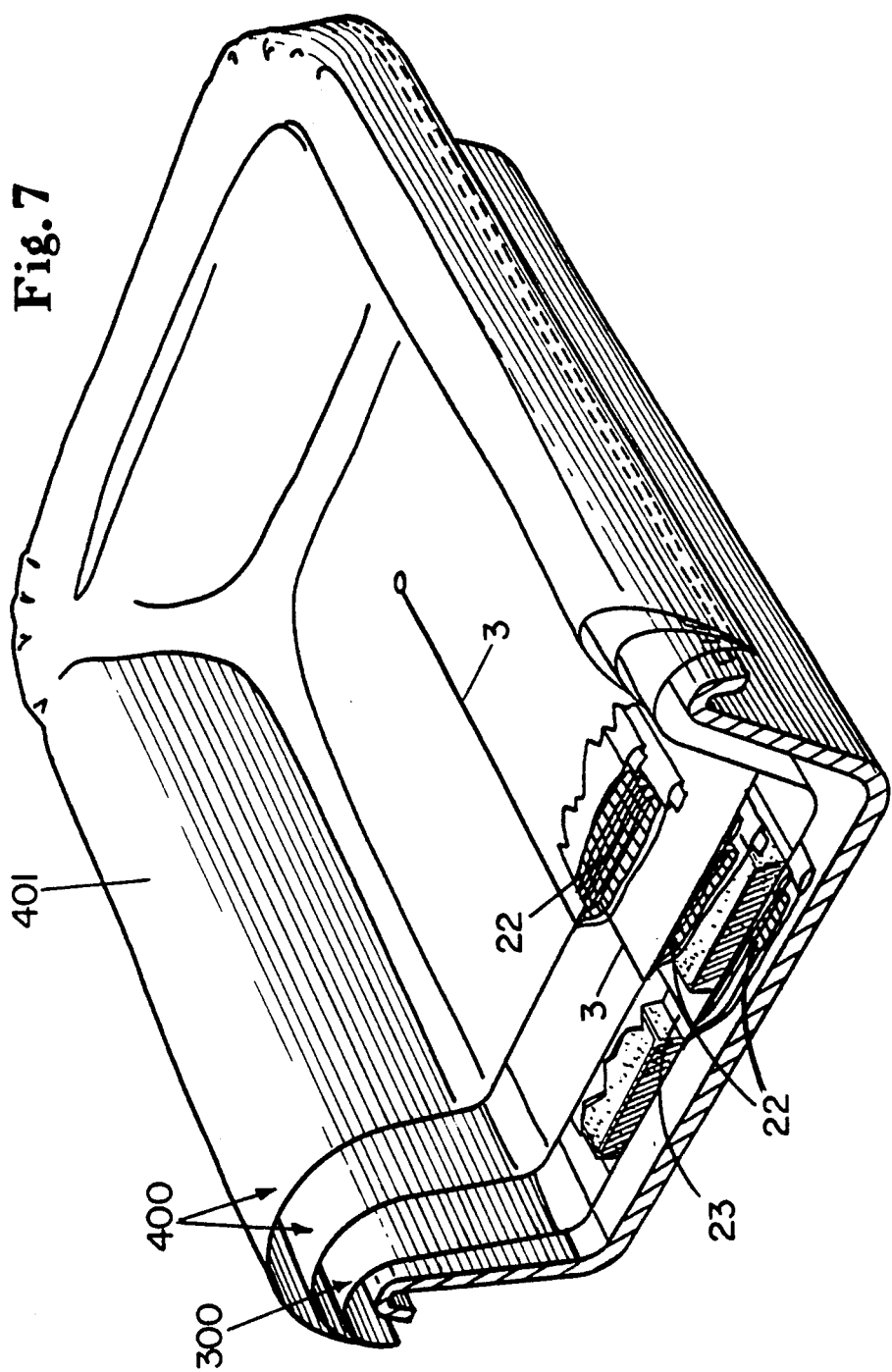
FIG. 7 is a simplified perspective cross-sectional view depicting a stack of several filtering and disposal systems of the present invention which do not include a liquid absorbent means resting atop a lowermost filtering and disposal system of the present invention which does include a liquid absorbent means.

In yet another embodiment of the present invention, a stack of filtering and disposal systems 400 is placed atop a filtering and disposal system 300, as generally shown in FIG. 7. In this embodiment, the filtering and disposal systems 400 can be constructed in a manner generally similar to embodiment 100 shown in FIG. 1. However, in embodiment 400, the protective member 401 is comprised of a liquid pervious web or an apertured plastic film. Protective member 401 could, for example, be the same material used as the top sheet 32 on absorbent structures 13 on filtering and disposal system 300 shown in FIG. 5a.

In the configuration depicted in FIG. 7, the filtering and disposal systems 400 provide the opportunity to successively remove fecal excrement from the granular litter, while the liquid excreta passes through all of the liquid pervious protective members 401 until it reaches one or more absorbent structures 13 located on the uppermost surface of the lowermost protective member 300.

After all of the systems 400 have been removed, the litter is subjected to another use cycle and the lowermost system 300 is finally lifted. The granular litter is thereby filtered a final time, and all liquid excreta contained in absorbent structures 13 is disposed of along with the spent filtering and disposal system 300. The litter may then be used a final time prior to disposal, or the process can begin anew by transferring the litter to a secondary receptacle, inserting a new stack of filtering and disposal systems into the litter box 26, and refilling the litter box with granular litter from the secondary receptacle.

Figure 8:
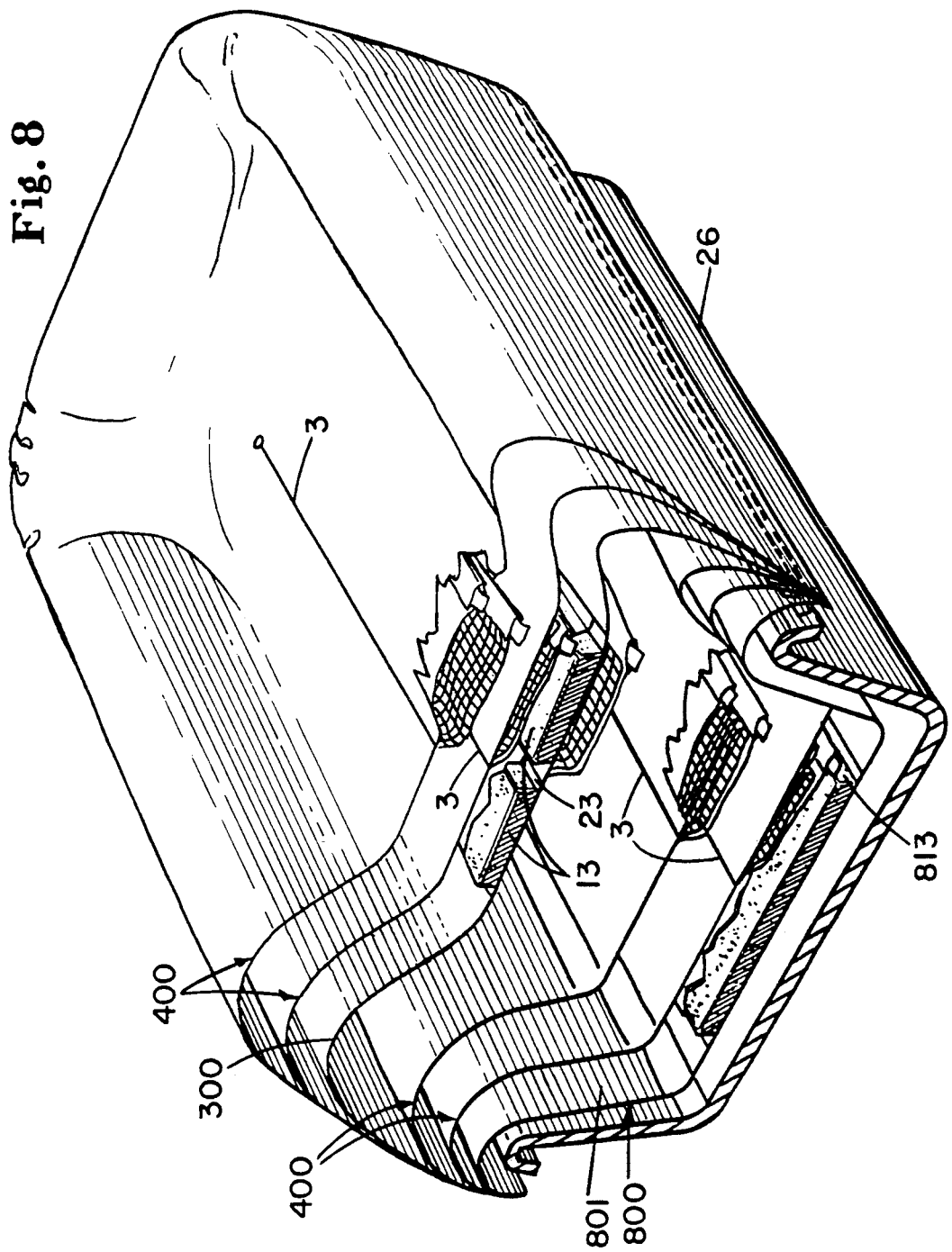
FIG. 8 is a simplified perspective cross-sectional view showing two groupings of filtering and disposal systems of the present invention stacked atop each other.

FIG. 8 depicts a series of stacks of the type just described inserted within a litter box 26. However, as shown in FIG. 8, the lowermost unit 800 in the lowermost stack does not include an opening in the protective member 801 nor an underlying filtering member, as do the other filtering and disposal systems described herein. In addition, the lowermost unit 800 preferably includes a single large absorbent structure 813 rather than a pair of absorbent structures 13, since an opening in the lowermost unit 800 is not only unnecessary, but in fact, undesirable. Absorbent structure 813 may, nonetheless, be constructed in a manner generally similar to absorbent structures 13 in embodiment 300. The use of lowermost unit 800 permits convenient disposal of the spent granular litter at the end of the litter's useful life along with unit 800.

In the case of a granular litter which is non-absorbent to liquid (and preferably non-adsorbent to odor) and which theoretically could be used almost indefinitely, FIG. depicts a possible continuous "litter cleansing" procedure. In this case the last filtering and disposal system 300 in a given stack has a slit 23 which opens when the system 300 is lifted to allow the granular litter 27 to be filtered into a first litter box 26A. (Note that shroud 25 and drawstring 10 have been deleted for clarity in FIG. 11.) The spent filtering and disposal system 300 with liquid and solid waste 9 contained therein is then disposed of in a suitable manner, as generally indicated by arrow I.

The "cleansed" granular litter 27 is then poured from the first litter box 26A into a second litter box 26B (as indicated by arrow II), litter box 26b having already been provided with a new stack of filtering and disposal systems 300, of the type shown in FIG. 5a. The first litter box 26A is then nested beneath the second litter box 26B, as indicated by arrow III, and the collection process is repeated with the litter boxes 26A and 26B having switched positions.

As will be understood from a reading of the present specification, filtering and disposal systems of the present invention should be constructed strongly enough that, when lifted from the litter box or receptacle to filter the granular litter containing fecal excrement, they will remain intact. For house cats, this requirement is normally met by providing sufficient strength to lift between about seven and about ten pounds of granular litter, since this quantity of litter is reasonably typical for pet owners who keep house cats. For larger animals, and consequently larger amounts of granular litter, the strength parameters of the systems employed must be adjusted upwardly, as appropriate.

If desired, filtering and disposal systems of the present invention may be packaged and marketed as a complete, self-contained animal waste handling system. In such case, one or more filtering and disposal systems of the present invention may be preassembled in a receptacle, which could even comprise the cardboard shipping carton used to transport the system. A prepackaged quantity of granular litter could be included with the system so that all the pet owner need do to place the system in service is open the shipping carton and deposit the granular litter on top of the uppermost system.

While particular embodiments of the present invention have been illustrated and described, it will be obvious to those skilled in the art that various changes and modifications can be made without departing from the spirit and scope of the invention, and it is intended to cover in the appended claims all such modifications that are within the scope of this invention.

What is claimed is:

1. A disposable filtering and disposal system for installation in a litter box beneath a granular litter material contained in said litter box, said system and said granular litter material being used by an animal owner for the collection of both solid and liquid animal excreta, said system being capable of automatically separating substantially all of the solid animal excreta from the granular litter material contained in said litter box when said system is lifted from said litter box to initiate the filtering operation, said system comprising:
   (a) a porous filtering member having an uppermost surface and exhibiting a pore size which will readily permit the granular litter material to pass therethrough, yet retain substantially all of the solid animal excreta coming in contact therewith during the filtering operation on its uppermost surface; and
   (b) a protective member having a perimeter substantially coinciding with said litter box and an uppermost surface which contacts the granular litter material contained in said litter box in use and which is capable of substantially resisting damage when subjected to digging or clawing by animals secured in superposed relation to and completely overlying said uppermost surface of said porous filtering member, said protective member including means for forming an opening having a predetermined periphery in its uppermost surface when said filtering and disposal system is lifted from the litter box to initiate the filtering operation, said filtering member being secured in underlying relation about said predetermined periphery of said opening in said protective member so that said filtering member is protected from damage due to digging or clawing by animals during the normal use cycle by said overlying protective member, yet substantially all of the granular litter material containing said solid animal excreta which is located on said uppermost surface of said protective member will pass through said opening and be filtered by said filtering member when said system is lifted from said litter box.

2. The system of claim 1, wherein said protective member is substantially impervious to fluid.

3. The system of claim 2, wherein said protective member is comprised of plastic film.

4. The system of claim 1, said system further including a shroud having an uppermost end and a lowermost end, the uppermost end of said shroud secured about said filtering member to help control the direction of discharge of said filtering granular litter material, to minimize the escape of dust during the filtering operation and to enclose said filtering member containing said solid animal excreta for sanitary disposal thereof.

5. The system of claim 1, wherein said filtering member is comprised of a porous plastic mesh.

6. The system of claim 5, wherein said porous plastic mesh exhibits a pore size capable of inscribing a circle having a diameter between about 0.10 inches and about 0.65 inches.

7. The system of claim 1, said system further including means for grasping and lifting said system located in said protective member.

8. The system of claim 7, wherein said grasping means in said protective member comprises a drawstring secured about said perimeter of said protective member and exposed for grasping and lifting on at least two opposed edges of said protective member.

9. The system of claim 4, wherein said lowermost end of said shroud further includes a drawstring secured about its periphery for closing said shroud after the filtering operation has been completed.

10. The system of claim 1, wherein said protective member is comprised of a fluid pervious nonwoven material.

11. The system of claim 1, wherein said protective member is comprised of an apertured plastic film.

12. The system of claim 1, wherein said means for forming an opening in said uppermost surface of said protective member comprises a slit in said protective member.

13. The system of claim 12, wherein said slit is frangibly secured in a closed position until the filtering operation is initiated by lifting said system from said litter box, whereupon the weight of said granular litter material destroys said frangible securements to form said opening.

14. The system of claim 13, wherein said frangible securement of said slit comprises a pair of upwardly oriented flanges releasably secured to one another, said flanges being subjected to peeling forced imposed by the weight of said granular litter material when said system is lifted.

15. A stack comprised of at least two systems as described in claim 1, said systems in said stack being releasably secured to one another about the perimeters of their protective members to permit removal of only the top system remaining within said stack during any given filtering operation.

16. The stack of claim 15, further including at least one system as described in claim 15 releasably secured to the bottom of said stack.

17. A disposable filtering and disposal system for installation in a litter box beneath a granular litter material contained in said litter box, said system and said granular litter material being used by an animal owner for the collection of both solid and liquid animal excreta, said system being capable of automatically separating substantially all of the solid animal excreta from the granular litter material contained in said litter box when said system is lifted from said litter box to initiate the filtering operation, said system comprising:

(a) a porous filtering member having an uppermost surface and exhibiting a pore size which will readily permit the granular litter material to pass therethrough, yet retain substantially all of the solid animal excreta coming in contact therewith during the filtering operation on its uppermost surface; and (b) a protective member having a perimeter substantially coinciding with said litter box and an uppermost surface which contacts the granular litter material contained in said litter box in use and which is capable of substantially resisting damage when subjected to digging or clawing by animals secured in superposed relation to and completely overlying said uppermost surface of said porous filtering member, said protective member including means for forming an opening having a predetermined periphery in its uppermost surface when said filtering and disposal system is lifted from the litter box to initiate the filtering operation, said filtering member being secured in underlying relation about said predetermined periphery of said opening in said protective member so that said filtering member is protected from damage due to digging or clawing by animals during the normal use cycle by said overlying protective member, yet substantially all of the granular litter material containing said solid animal excreta which is located on said uppermost surface of said protective member will pass through said opening and be filtered by said filtering member when said system is lifted from said litter box; and (c) liquid absorbent means for absorbing liquid animal excreta secured to said system so that liquid animal excreta contained within said absorbent means is removed from said litter box and disposed of along with said solid animal excreta retained within said filtering member when said filtering operation has been completed.

18. A self-contained waste collecting and disposal system comprising, in combination, (a) at least one filtering and disposal system as described in claim 1 or claim 17 and;

(a) a container capable of functioning as a litter box in which said system can be secured; and (b) a predetermined quantity of said granular litter material to be deposited in said litter box on top of said filtering and disposal system.

19. The self-contained waste collecting and disposal system of claim 18, wherein said container comprises a shipping carton in which said at least one filtering and disposal system and said predetermined quantity of granular litter material are placed for shipment.

20. The self-contained waste collecting and disposal system of claim 19, wherein said granular litter material is housed within a sealed flexible package which is opened by an animal owner to place the self-contained waste collecting and disposal system in service.

21. The system of claim 19, wherein said liquid absorbent means comprises a fluid pervious top sheet secured in superposed relation over a liquid absorbent core, said absorbent core having a fluid impervious back sheet secured in underlying relation thereto.

22. The system of claim 19, wherein said liquid absorbent means comprises an integral of said protective member.

23. The system of claim 22, wherein said liquid absorbent means is divided into at least two discrete portions, said discrete portions being located adjacent opposed edges of said means for forming an opening in said uppermost surface of said protective member.

24. The system of claim 23, wherein said means for forming an opening said uppermost surface of said protective member comprises a slit.

25. The system of claim 23, wherein said slit is frangibly secured in a closed position until the filtering operation is initiated by lifting said system from said litter box, whereupon the weight of said granular litter material destroys said frangible securement to form said opening.

26. The system of claim 17, said system further including means for releasably securing said system to said litter box.

27. The system of claim 17, wherein said liquid absorbent means includes a liquid absorbent material selected from the group consisting of comminuted wood pulp fluff, cellulosic tissue, polymeric gelling agents (PGA) and combinations thereof.

28. A stack comprised of at least two systems as described in claim 17, said systems in said stack being releasably secured to one another about the perimeters of their protective members to permit removal of only the top system remaining in said stack during any given filtering operation.

* * * * *

UNITED STATES PATENT AND TRADEMARK OFFICE
CERTIFICATE OF CORRECTION

PATENT NO. : 5,062,392

DATED : 11/5/91

INVENTOR(S) : Bruce W. Lavash

It is certified that error appears in the above-identified patent and that said Letters Patent is hereby corrected as shown below:

On the title page:

In the REFERENCES CITED Section Patent No. 4,817,560, "Price et al." should read -- Prince et al. -- .

Column 4, line 68, delete -- taken at a point corresponding to section line A-A of Figure 1b, -- .

Column 5, line 11, after "broken .." insert -- away, -- .

Column 5, line 20, delete -- taken at a point corresponding to section line B-B of Fig. 5a, -- .

Column 7, line 25, after "member" insert -- 1 -- .

Column 7, line 61, "form" should read -- from -- .

Column 8, line 13, after "wherein" insert -- the -- .

Column 10, line 55, after "Opening" delete -- or slit -- .

Column 10, line 56, after "access" insert -- to -- .

Column 12, line 61, after "Fig." insert -- 11 -- .

Column 14, line 24, after "shroud" insert -- being -- .

Column 14, line 26, "filtering" should read -- filtered -- .

UNITED STATES PATENT AND TRADEMARK OFFICE
CERTIFICATE OF CORRECTION

PATENT NO. : 5,062,392
DATED : 11/5/91
INVENTOR(S) : Bruce W. Lavash

It is certified that error appears in the above-identified patent and that said Letters Patent is hereby corrected as shown below:

Column 14, line 66, "forced" should read -- forces -- .

Column 15, line 27, delete -- and -- .

Column 16, line 5, delete -- (a) -- .

Column 16, line 6, ";" should read -- : -- .

Column 16, line 28, after "integral" insert -- portion -- .

Signed and Sealed this

Eighteenth Day of May, 1993

Attest:

MICHAEL K. KIRK

*Attesting Officer*      *Acting Commissioner of Patents and Trademarks*